Fig. 1a.

Inventor:
Donald E. Garr,
by Harry E. Dunham
His Attorney.

Fig. 2.

Patented Oct. 29, 1946

2,410,283

UNITED STATES PATENT OFFICE 2,410,283

SCREW-DOWN CONTROL SYSTEM

Donald E. Garr, Schenectady, N. Y., assignor to General Electric Company, a corporation of New York Application April 24, 1945, Serial No. 589,972

14 Claims. (Cl. 80—56)

This invention relates to control systems, more particularly to control systems for rolling mill screwdown apparatus and it has for an object the provision of a simple, reliable and improved control system of this character.

More specifically, the invention relates to control systems in which means are provided for presetting a plurality of consecutive roll openings, and a further object of the invention is the provision of means for effecting a rapid and highly accurate positioning of the screws at the preset positions in response to simple, manual movements of a pilot device such as a pushbutton.

Another object of the invention is the provision of a new and improved means for preventing overshooting in moving one of the rolls to the correct position for a selected roll opening.

Another object is the provision of a control system of the character described in which the final movement of approach of the movable roll to the correct position for a roll opening is always in the same direction regardless of whether the opening is being increased or decreased.

Another object of the invention is the provision of a system of this character in which provision is made for compensating for variations in the diameters of the rolls such as are caused by grinding the rolls.

Still another object of the invention is the provision of means for causing sufficient current to circulate in the motor armature circuit after the movable roll has come to rest in a correct position to maintain pressure on the roll in the same direction as the final movement of approach.

In carrying the invention into effect in one form thereof, the screwdown driving motor is supplied from an adjustable voltage generator. The supply of current to the motor is controlled by means of an exciter dynamo-electric motor machine of which the excitation is controlled in response to the difference in position between a preselected position and the actual instantaneous position of the movable roll. For presetting the roll openings, a roll opening selector means is provided. This means is preferably a synchronous type of signal transmission system comprising a plurality of units for presetting a succession of roll openings, and a unit connected with the screwdown mechanism for comparing the position of the roll with the preset positions for which the selector units are adjusted. The difference in position of the preset unit and the unit connected to the screwdown mechanism is utilized to supply a signal voltage which may be amplified by suitable amplifying means.

The exciter dynamo-electric machine is provided with a control field winding which is excited in response to the difference between a reference voltage and a control voltage derived from the armature current of the screwdown drive motor. Means are provided for reducing the reference voltage to a very low value when the movable roll is brought to rest in a position corresponding to the preset position for which the roll opening selector unit is adjusted.

An additional feature is the excitation of the control field winding in response to the difference between a second reference voltage and a control voltage derived from the field excitation current of the adjustable voltage generator together with means for varying this second reference voltage in response to the difference between the preset position of the mill roll and its actual instantaneous position.

For a better and more complete understanding of the invention, reference should now be had to the following specification and the accompanying drawings of which

Figure 1A:
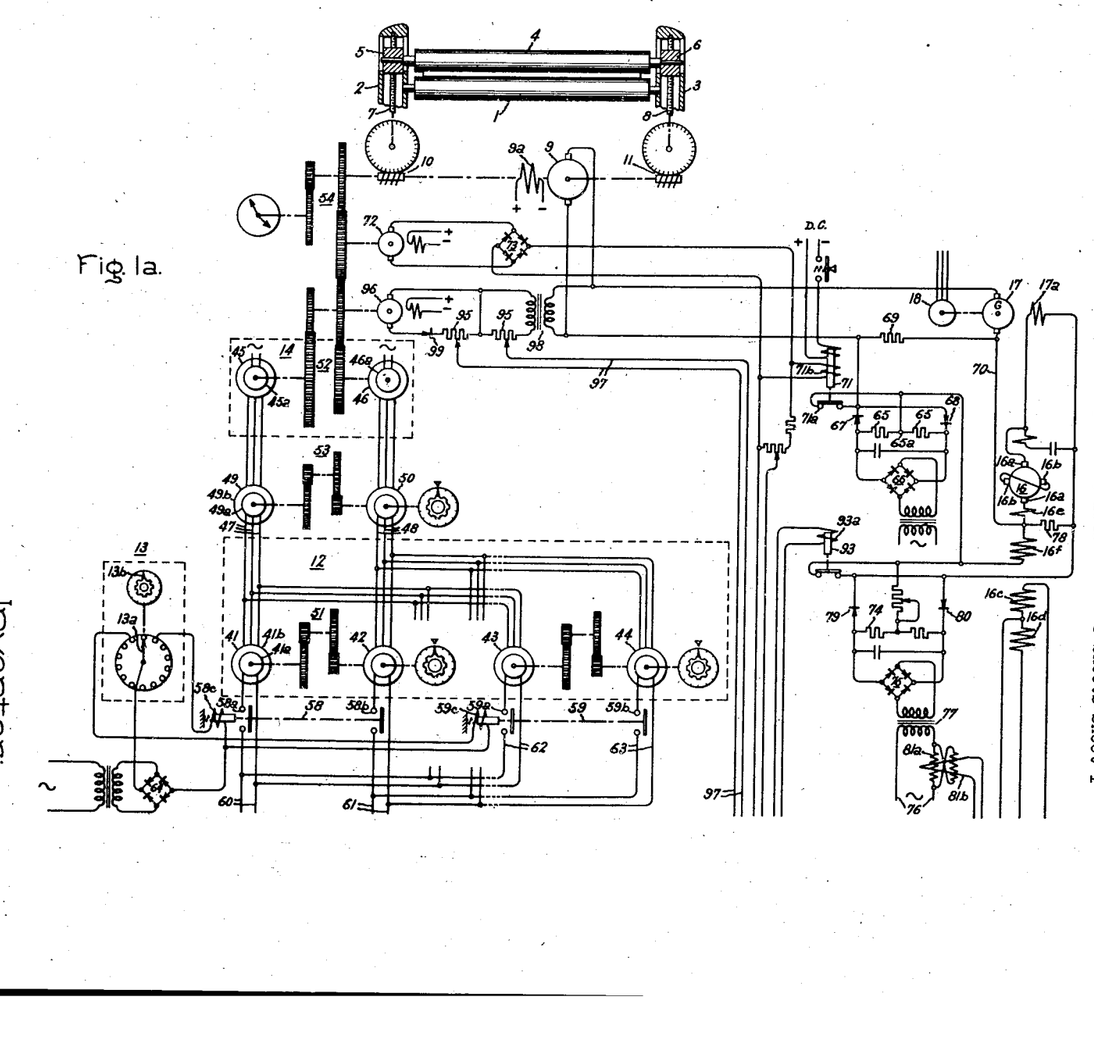
Fig. 1 is a simple, diagrammatical illustration of the embodiment of the invention.
Figure 1B:
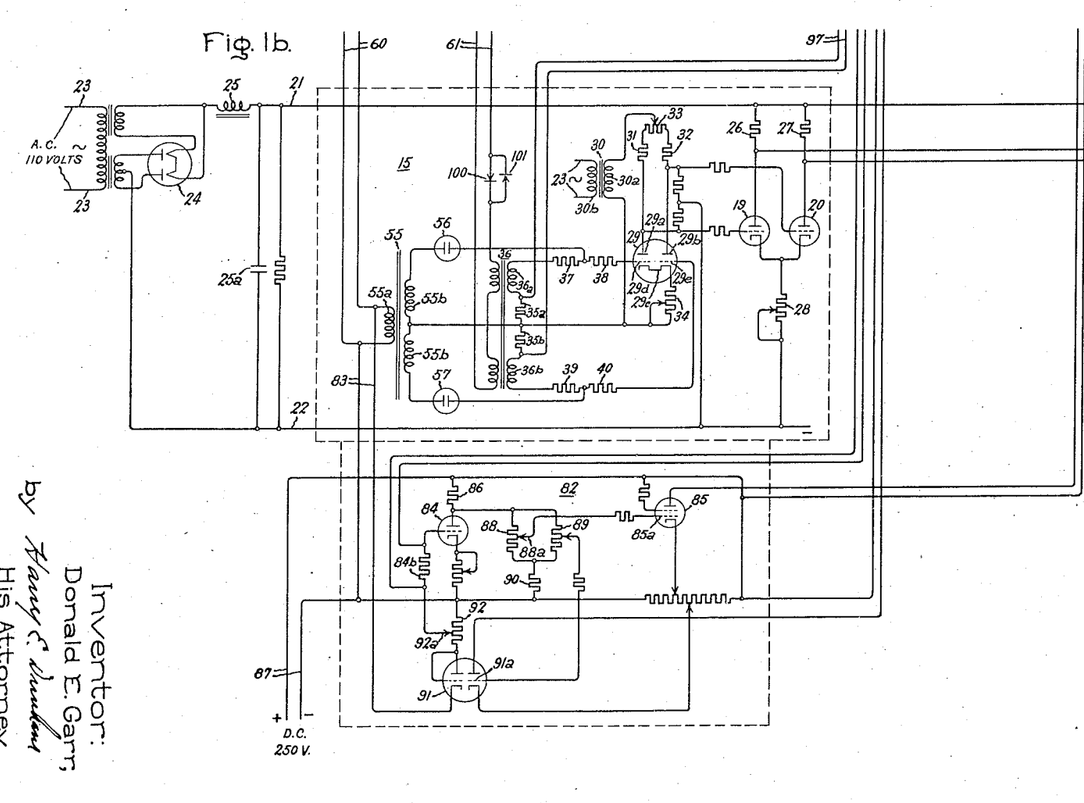

Referring now to the drawings, the lower roll 1 of a rolling mill is journalled for rotation in uprights 2 and 3 of the housing (not shown) of a rolling mill. An upper roll 4 is journalled in movable screw blocks 5 and 6 which are in threaded engagement with screws 7 and 8 to provide for moving the roll 4 with respect to the lower roll 1 to vary the opening between the rolls. These screws 7 and 8 are driven by any suitable driving means such, for example, as the direct current electric motor 9 to the drive shaft of which the screws are connected through suitable reduction worm gearing 10 and 11 respectively.

The upper roll 4 is to be moved to a plurality of preselected positions to provide a plurality of roll openings. The movement of the roll 4 is under the control of suitable roll opening selector means 12 comprising a plurality of roll opening selector units, one for each pass. These units are under the control of a pass selector 13 which has a plurality of positions corresponding to the number of roll opening selector units. In each position of the pass selector, a different roll opening selector is brought into action.

Operatively associated with the screwdown mechanism is a signal unit 14 which cooperates with the roll opening selector units to produce a signal voltage which serves as a detector of the difference between the preselected position of the roll 4 and its actual position. This signal voltage is amplified by a suitable electric type valve amplifier 15. The output voltage of the amplifier is utilized to control the excitation of an exciter dynamo-electric machine 16 which in turn controls the excitation of a generator 17 from which the screwdown drive motor 9 is supplied. The generator supplies a voltage which causes the motor to move the movable roll to the position preselected on the roll opening selector unit.

The motor 9 is provided with a field winding 9a which is supplied from any suitable source of direct voltage. As shown, the armature of the motor 9 is connected in a loop circuit with the armature of the supply generator 17. This generator is driven at a speed which is preferably substantially constant by any suitable driving means such as the induction motor 18. The generator is provided with a field winding 17a which is connected to the load circuit brushes 16a of the exciter dynamo-electric machine 16. Since the generator 17 is driven at a substantially constant speed, its voltage varies in accordance with the excitation of its field winding.

The exciter 16 is a special cross-armature excited dynamo-electric machine. In addition to its load brushes 16a it has a pair of short-circuited armature brushes 16b which are arranged on an axis at right angles to the axis of the load brushes. The exciter 16 is driven at a speed which is preferably constant by any suitable driving means (not shown). The axis of the flux which is produced by the short-circuited armature brushes 16b is referred to as the "short-circuit axis" and the axis which is displaced 90 electrical degrees from the short-circuit axis is referred to as the "control axis." The net flux along the control axis is produced by two opposing directional reference field windings 16c and 16d, a series compensating field winding 16e, and a control field winding 16f. The flux along the short-circuit axis on the machine is produced by the armature reaction of the short-circuit current. This short-circuit axis flux generates the voltage which appears across the load axis 16a, and the control axis flux produces the voltage which appears across the short-circuit brushes 16b and causes short-circuit current to flow. Two important characteristics of the machine 16 are its extremely high speed of response and its high amplification factor, i. e., the ratio between the watts input to the directional field windings 16c and 16d to the watts of the load circuit. This amplification factor may be as high as 25,000:1.

The directional field windings 16c and 16d are connected in the output circuits of the electric valves 19 and 20 which constitute the second stage of the amplifier 15. The output circuits of these valves 19 and 20 are connected across a suitable source of direct voltage such as represented by the positive and negative buses 21 and 22. This direct voltage may be obtained from a source of alternating voltage 23 by means of an electric type valve rectifier 24. The ripple is removed from the rectified voltage by means of a suitable filter illustrated as comprising a series reactor 25 and a shunt capacitor 25a. A voltage drop resistor 26 is included in the output circuit of the valve 19 and a similar resistor 27 is included in the output circuit of the valve 20. The directional field winding 16c is connected across the resistor 27 and the directional field winding 16d is connected across the resistor 26. Thus the field windings 16c and 16d are excited in accordance with the voltage drop across the resistors 27 and 26 respectively, which voltage drops are proportional to the currents flowing in the output circuits of the valves. The cathode grid circuits of the valves 19 and 20 extend through an adjustable self-biasing resistor 28 to the negative bus 22 and thus the grids of these valves are given a negative bias.

A twin triode electric valve 29 constitutes the first stage of the amplifier 15. It has a pair of conducting paths for controlling the grid voltage of the valves 19 and 20. The anode-cathode or output circuit of the valve 29 is connected across the secondary winding 30a of a transformer 30 of which the primary winding 30b is supplied from a suitable source of alternating voltage which may be and preferably is the source 23. As shown, the anodes 29a and 29b are connected through resistors 31 and 32 respectively and through the opposite halves of an adjustable equalizing resistor 33 to one terminal of the secondary winding 30a and the common cathode 29c is connected through an adjustable biasing resistor 34 to the opposite terminal of the secondary winding 30a. Since the valve 29 has two anodes, it has two conducting paths and the currents in these paths are controllable by controlling the voltages applied to the two control grids 29d and 29e. The grid 29d controls the flow of current in the path between the anode 29a and the cathode, and the grid 29e controls the conductivity in the path between the anode 29b and the cathode. The cathode grid circuit for the left-hand conducting path of the valve extends from the cathode through the biasing resistor 34, the upper half 35a of a resistor, and the secondary winding 36a of a transformer 36 and resistors 37 and 38 to the grid 29d. Similarly, the cathode grid circuit for the right-hand conducting path of the valve extends from the cathode through the biasing resistor 34 and the lower half 35b of a resistor and a secondary winding 36b of transformer 36, and resistors 39 and 40 to the grid 29e. The voltages of the grids 29d and 29e with respect to the voltage of the cathode 29c, as a result of the inclusion of the biasing resistor 34 in the anode-cathode circuit, are such that both paths of the valve normally conduct equal amounts of current. This condition of equal conduction in both paths of the valve 29 occurs when the active roll opening selector unit is in correspondence with the mill roll signalling unit 14, i. e., when the movable roll 4 is in the selected position to which the active selector unit is adjusted. When equal amounts of current are flowing through both paths of the valve 29, the voltage drops across the resistors 31 and 32 are equal and these voltage drops combined with the voltage drop across the resistor 28 bias the voltages of the grids of valves 19 and 20 with respect to their cathodes so that these valves also conduct equal amounts of current. The equal currents conducted by the valves 19 and 20 produce voltage drops across the resistors 26 and 27 which excite the control field windings 16c and 16d of the exciter dynamo-electric machine 16. However, since the control field windings 16d and 16e act in opposition to each other, the net exciting flux along the control axis of the machine 16 is zero. It will thus be clear from the foregoing that when the movable roll 4 is in a position corresponding to the position to which the active selector unit is adjusted, equal amounts of current flow through both paths of the valve 29 and, likewise, equal amounts of current flow in valves 19 and 20 with the result that the terminal output voltage of the exciter 16 is zero.

The signal voltages are supplied to the grids 29d and 29e of the valve 29 from the active roll opening selector units 12 through the transformer 36 of which the secondary windings 36a and 36b are connected in the cathode grid circuits of the valve 29, as explained in the foregoing, and whose primary winding is connected to the active roll opening selector unit.

Each roll opening selector unit comprises two rotary induction devices of which one provides a coarse control and the other provides a fine or vernier control. The unit for the first pass comprises the two rotary induction devices 41 and 42 and the unit for the last pass comprises the induction devices 43 and 44. Since the selector units for all passes are identical, only the units for the first and last passes are illustrated and only the unit for the first pass is described in detail.

The device 41 of the first selector unit furnishes the coarse control and the device 42 furnishes the fine control. Similarly the device 43 of the final pass selector unit furnishes the coarse control and the device 44 furnishes the fine control. The rotary induction device 41 comprises a rotor member 41a which is provided with a single phase winding (not shown) and a stator member 41b provided with a distributed 3-element winding (not shown) which is physically similar to the 3-phase winding of an ordinary wound rotor induction motor. The stator and rotor windings are arranged in inductive relationship with each other. This device is known to the art as a Selsyn. The device 42 is in all respects identical with the device 41.

The signal unit 14 which is connected with the screwdown mechanism comprises two Selsyns 45 and 46 of which the Selsyn 45 cooperates with the coarse control Selsyn 41 and the Selsyn 46 cooperates with the vernier control Selsyn 42. The single-phase winding on the rotor member of the Selsyn 45 is supplied with alternating voltage from a suitable source which is preferably the source 23 from which the first stage valve 29 of the amplifier 15 is supplied. The corresponding terminals of the 3-phase stator windings of the Selsyns 41 and 45 are connected together by electrical connections 47 and, similarly, the corresponding terminals of the stator windings of the Selsyns 42 and 46 are connected together by means of electrical connections 48.

For the purpose of compensating for variations in the diameters of the mill rolls resulting from grinding, differential electrical devices 49 and 50 are included in the connections 47 and 48 respectively. The device 49 has a rotor member 49a which is provided with a distributed 3-element winding (not shown) and the stator member 49b is provided with a similar distributed 3-element winding (not shown).

The excitation of the single-phase winding on the rotor of the Selsyn 45 produces an alternating magnetic field which induces voltages in the elements of the stator winding. These induced voltages cause currents to flow in the stator winding of the Selsyn 41, thereby producing an alternating magnetic field similar to the magnetic field produced by current flowing in the rotor winding of the Selsyn 45. When the axis of the rotor winding of the Selsyn 41 is at right angles to the axis of the alternating magnetic field, zero voltage is induced in the rotor winding and the rotor member 41a is said to be in correspondence with the rotor member 45a of the Selsyn 45. When the axis of the rotor winding of the Selsyn 41 is parallel to the axis of the alternating magnetic field produced by the currents in the stator winding, the voltage induced in the rotor winding is a maximum. For intermediate positions of the axis of the rotor winding with respect to the axis of the alternating magnetic field, the induced voltage has corresponding intermediate values.

The axis of the magnetic field of the Selsyn 41 can be shifted by rotating the rotor member 49a of the differential Selsyn 49 with respect to the stator member 49b, thereby to vary the angle between the axis of the magnetic field produced by currents flowing in the stator winding of the Selsyns 49b with respect to the axes of the winding elements on the rotor member 49a.

The Selsyns 42 and 46 are in all respects identical with the Selsyns 41 and 45, and the differential Selsyn 50 is in all respects identical with the differential Selsyn 49. The rotor member of the Selsyn 42 is connected to the rotor member of the Selsyn 41 through gearing 51 which may have any suitable ratio such, for example, as 35:1. Similarly, the rotor members of the Selsyns 45 and 46 and the rotor members of the differential Selsyns 49 and 50 are connected together by means of gearings 52 and 53 having the same ratio of 35:1. The rotor members of the Selsyns 45 and 46 are connected to the screws 7 and 8 through gearing 54 of which the ratio is such that the rotor member 45 rotates through an angle which is somewhat less than 360 degrees, e. g., 267 degrees when the roll 4 is moved from its zero position to its maximum opening position.

The high ratio of the gearing, i. e. 35:1, between the vernier control Selsyns and the coarse control Selsyns produces an extremely high degree of accuracy and sensitivity of the control. If the ratio is 35:1 as assumed, then for each movement of the roll 4 which produces $10^2/_7$ degrees of rotation of the rotor member 45a of the Selsyn 45 the rotor member 46a of the Selsyn 46 is rotated a full 360 degrees. However, since the axes of the rotor winding of the Selsyn 42 and the magnetic field of the stator winding are parallel at two points in each complete revolution of the rotor 46a of the Selsyn 46, i. e., at zero degrees rotation and at 180 degrees rotation, it will be clear that the rotors 46a and 42a must not be allowed to become more than 180 degrees out of correspondence with each other, because when this amount of positional disagreement occurs, the same electrical relationship exists between the rotor windings as exists when the rotors are in correspondence with each other. Before this amount of positional disagreement is exceeded the control is taken over by the coarse control systems comprising the Selsyns 45 and 41.

From the foregoing it is seen that when the rotor member 42a of the Selsyn 42 is not in correspondence with the rotor member 46a of the Selsyn 46, a voltage is supplied to the grid circuit of the amplifier 15 which in turn results in a variation in the relationship of the currents flowing in the conducting paths of the valve 29. The grid connections to the electric valve 29 are so made, that when the voltage applied to one of the grids is increased, the voltage applied to the other grid is simultaneously decreased and, consequently, when the current through one of the conducting paths is increased, the current through the other conducting path is simultaneously decreased.

In order that the coarse control Selsyns may take over the control from the vernier Selsyns before the positional disagreement of the rotors of the Selsyns 42 and 46 exceeds 180 degrees, the single-phase rotor winding of the coarse Selsyn 41 is connected to the terminals of the primary winding 55a of a transformer 55 of which the terminals of the secondary winding 55b are connected to the grids 29d and 29e through electric valves 56 and 57. The midpoint of the secondary winding 55b is connected to the midpoint of the resistor 35a, 35b. Thus, it will be seen that the Selsyns 41 and 45 constitute a low speed system and provide the desired coarse control.

The electric valves 56 and 57 may be of any suitable type but are preferably of the two electrode type into the envelopes of which a small quantity of inert gas such, for example, as neon is introduced after exhaust. A characteristic of a valve of this character is that when a voltage of less than a predetermined critical value is applied to its terminals, the valve does not conduct current and when this critical voltage is exceeded, the neon gas becomes ionized and the valve becomes conducting.

The transformer 55 is so designed that when the positional disagreement of the Selsyns 41 and 45 is less than a predetermined amount, e. g. 5 degrees or less, the voltage applied to valves 56 and 57 is less than the critical ionization or breakdown voltage of these valves, but equals or exceeds the critical voltage when the positional disagreement equals or exceeds this predetermined amount. Thus, when the positional disagreement is less than the predetermined amount, the control connections between the coarse control system and the grids of valve 29 are interrupted and the coarse control system is ineffective, and when the disagreement equals or exceeds this amount, the valves 56 and 57 become conducting and the voltage induced in the secondary winding of the transformer 55 is applied to the grids of the valve 29 and is therefore effective in controlling the valve. The resistors 37 and 39 have very high ohmic values and therefore assist the valves 56 and 57 in transferring the control from the fine control Selsyns to the coarse control Selsyns when the positional disagreement equals or exceeds the predetermined amounts mentioned in the foregoing description.

For the purpose of transferring the control of the screwdown motor from one roll opening selector unit to another, a plurality of switching devices such as the electromagnetic switches 58 and 59 are provided. These switching devices are under the control of the pass selector switch 13. The switching device 58 has normally open contacts 58a and 58b in the connections 60 and 61 respectively between the input to the amplifier 15 and the rotor windings of the Selsyns 41 and 42 which constitute the roll opening selector unit for the first pass. Similarly, the switch 59 has normally open contacts 59a and 59b in the connections 62 and 63 respectively between the input to the amplifier and the rotor windings of the Selsyns 43 and 44 which constitute the roll opening selector unit for the last pass, which in the apparatus illustrated is the 13th pass.

These switches 58 and 59 have operating coils 58c and 59c respectively. One terminal of each of these operating coils is connected to one terminal of a source of direct voltage such as the rectifier 64 of which the other terminal is connected to the movable contact arm 13a of the pass selector switch 13. The other terminal of each of the operating coils is connected to a corresponding stationary contact of the pass selector switch, e. g., that of the coil 58c is connected to the first contact in the counterclockwise direction and that of the coil 59c is connected to the 13th contact.

As pointed out in the foregoing, a roll opening selector unit similar to the unit 41, 42 is provided for each pass. These additional selector units are connected in parallel with the unit 41, 42 as indicated by the open-ended parallel connections shown in the drawings and designated "other units." For each of these additional units there is provided an electromagnetic switch similar to the switch 58 having normally open contacts in the connections from its associated roll opening selector unit to the input of the amplifier 15 and having an operating coil of which one terminal is connected to one terminal of the rectifier 64 and the other terminal is connected to a corresponding stationary contact of the pass selector switch.

The current limit control field winding 16f of the exciter dynamo-electric machine 16 is excited in response to the difference between a reference voltage and a voltage derived from the current which flows in the armature circuit of the drive motor 9. This reference voltage is provided by means of a resistor 65 which is connected across a source of substantially constant direct voltage such as the rectifier 66. The resistor 65 has a center tap 65a which is connected to one terminal of the current limit control field winding 16f. The opposite terminals of the reference voltage resistor 65 are connected through reversely connected rectifiers 67 and 68 to one terminal of a voltage dropping resistor 69 which is connected in the armature circuit of the drive motor 9. The opposite terminal of the field winding 16f is connected to the opposite terminal of the resistor 69 by means of a conductor 70. As a result of the inclusion of the rectifiers 67 and 68 in the connections, one half of the resistor 65 provides the reference voltage when the current flow in the armature circuit is in one direction and the other half provides the reference voltage for current flow in the opposite direction. The voltage drop across the resistor 69 is a measure of the current flowing in the armature circuit of the motor. When the voltage drop across the resistor 69 is less than the voltage drop across the active half of the resistor 65, no current flows in the field winding 16f and no current-limiting action takes place. On the other hand, when the voltage drop across the resistor 69 exceeds the reference voltage across the active half of the resistor 65, current flows in the field winding 16f. The magnitude of this current depends upon the difference between the voltage drop across the resistor 69 and the reference voltage of the active half of the resistor 65. The current in the field winding 16f flows in such a direction that the flux of the field winding 16f opposes the flux of whichever of the directional control field windings 16c or 16d is predominately energized. As a result of this differential action of the field winding 16f, the current flowing in the armature of the motor 9 is limited to a predetermined value of which the magnitude corresponds to the magnitude of the reference voltage of the resistor 65.

When the drive motor 9 is at rest with the mill roll 4 in a position corresponding to a selected roll opening, a small amount of current is caused to circulate in the armature circuit of the motor in such a direction as to maintain a downward force on the roll 4. In order that this circulating current may not overheat the motor, it is limited to a very low value. For this purpose a relay 71 is provided which has normally closed contracts 71a in the connection between the midpoint 65a of the reference voltage resistor and the terminal of the voltage dropping resistor 69 to which the resistor 65 is connected through rectifiers 67 and 68. The relay 71 is provided with an operating coil 71b which is supplied from a tachometer generator 72 to the terminals of which it is connected through a full wave rectifier 73. The tachometer generator 72 is driven by the motor 9 to the drive shaft of which it is connected through the gearing 54. Thus, the tachometer generator 72 generates a voltage which is proportional to the speed of the motor 9. Whenever the motor 9 is rotating, the generated voltage of the tachometer generator energizes the operating coil of the relay 71 sufficiently to maintain the contacts 71a open. However, when the motor 9 is at rest, the voltage of the tachometer generator is zero thereby deenergizing the operating coil 71b and allowing the contacts 71a to close. In the closed position of the contacts 71a both halves of the reference voltage potentiometer are short-circuited so that the effective reference voltage is very close to zero. As a result, the circulating current in the armature motor 9 is limited to a very low value.

For the purpose of preventing "overshooting," i. e., driving the mill roll 4 past a selected position in the downward position, means are provided for stabilizing the position. These stabilizing means comprise a control circuit for reducing the voltage supplied by the generator 17 to the motor 9 in accordance with the positional disagreement between the mill roll and the selected position to which it is being driven and also in accordance with the speed at which the roll is being driven. This is accomplished by exciting the current limit field winding 16f of the exciter in response to the difference between a control voltage which is proportional to the current supplied to the field winding 17a of the supply generator and a reference voltage which is varied in accordance with the positional disagreement between the active roll selector unit and the position of the mill roll 4. The reference voltage is provided by means of a center tap resistor 74 to which a direct voltage is supplied from a full wave rectifier 75. An alternating voltage is supplied to the rectifier from a suitable alternating voltage source 76 through a transformer 77 of which the primary winding is connected to the source, and the secondary winding is connected to the input of the rectifier. The control voltage is derived from the generator field current by means of a voltage dropping resistor 78 which is connected in the circuit of the generator field winding 17a. One terminal of this resistor is connected to one terminal of the current limit field winding 16f of the exciter and the other terminal is connected through reversely connected half wave rectifiers 79 and 80 to the opposite terminals of the reference voltage resistor 74 of which the center tap is connected to the other terminal of the current limit field winding. Thus, for one direction of current flow in the generator field circuit, the voltage drop across resistor 78 is compared with the voltage drop across one-half of the reference voltage resistor and the difference is applied to the control field winding 16f. For the reverse direction of current flow in the generator field circuit the voltage drop across the resistor 78 is compared with the voltage drop across the opposite half of the reference voltage resistor and the difference is applied to the current limit field winding 16f.

For the purpose of varying the reference voltages the reactance winding 81a of a saturable core reactor is connected in circuit between the source 76 and the rectifier 75 from which the reference voltage resistor 74 is supplied. As shown, it is connected in circuit with the primary winding of the transformer 77. The direct current which is proportional to the positional disagreement between the active roll opening selector unit and the position of the mill roll 4 is supplied to the saturating winding 81b of the reactor from an electric valve type amplifier 82 of which the input circuit is connected by means of conductors 83 to the rotor winding circuit of the coarse control Selsyn of the active roll opening selector unit. This amplifier has two stages of which the valve 84 constitutes the first stage and the valve 85 constitutes the second stage. As shown, the valve 84 is connected in series with a voltage dropping resistor 86 across the direct voltage source 87. A voltage divider comprising resistors 88 and 89 connected in parallel with each other and in series with a resistor 90 is connected from the anode of the first stage valve 84 to the negative side of the source 87. The second stage valve 87 is connected in series with the saturating winding 81b across the source. Its control grid 85a is connected to the slider 88a of the voltage divider 89, 90.

The alternating voltage of the coarse Selsyn of the active roll opening selector unit is rectified by the left-hand conducting valve of a twin triode valve 91 and the rectified voltage appears across the series adjustable resistor 92 of which the terminal which is remote from the anode is connected to the negative side of the source 87. The control grid of the first stage valve 84 is connected to the slider 92a of the resistor 92. As a result of these connections, a current which is proportional to the positional disagreement of the active selector unit and the mill roll 4 is caused to flow through the resistor 92. This current produces a corresponding voltage drop across the resistor 92, thereby decreasing the grid voltage of the first stage valve 84. The decreased grid voltage produces a corresponding decrease in the voltage drop across the resistor 86 and a corresponding increase in the voltage supplied to the voltage divider 88, 90. This increases the grid voltage of the second stage valve and correspondingly increases the current supplied to the saturating winding of the reactor 81. The increased saturation of the reactor correspondingly reduces its reactance and thereby increases the voltage supplied to the valve 84.

Thus, the magnitude of the reference voltage is adjusted in proportion to the distance of the mill roll 4 from the selected position to which it is moving. For the purpose of reducing the reference voltage substantially to zero when the mill roll is very close to the preselected position, a relay 93 is provided for substantially short-circuiting the reference voltage resistor. The operating coil 93a of the relay is connected in circuit with the right-hand conducting path of the valve 91 of which the control grid 91a is connected to the slider 89a of the voltage divider 89, 90. The net effect of the connections described in the foregoing is to control the excitation of the control field winding 16f so that the voltage which is supplied to the drive motor 9 and consequently the speed of the motor 9 is caused to be proportional to the distance the roll must move to its preselected position. The movement of the roll is therefore made in a minimum time. Further to aid in stabilizing the system, the reduction in the reference voltage is correlated with the speed with which the mill roll approaches a preselected position. This is accomplished by supplying to the grid circuit of the first stage valve 84 a reverse polarity voltage which varies with the speed of the motor 9. This voltage is obtained from the tachometer generator 72 through the rectifier 73 to which the resistor 84b in the grid circuit of the first stage valve 84 is connected by means of conductors 94. Owing to the presence of the rectifier 73 in the connections, the polarity of the voltage supplied in the input circuit of the valve 84 is always the same irrespective of the direction of rotation of the tachometer generator.

The main anti-hunt effect is produced by supplying to the input circuit of the amplifier 15 a reverse polarity voltage which varies with the speed of the drive motor 9. This voltage is obtained from a potentiometer 95 which is supplied from a tachometer generator 96 of which the drive shaft is connected to the drive shaft of the motor 9. The voltage derived from the potentiometer 95 is supplied through conductors 97 to the resistor 35a, 35b which is connected in the grid circuit of the first stage valve 29. The polarity of this voltage is such as to oppose the voltage which is supplied from the Selsyns to the input circuit. To this anti-hunt voltage is added a component voltage which is proportional to the rate of change of the voltage that is supplied to the motor 9. This voltage is added to the voltage derived from the potentiometer 95 by means of a transformer 98 of which the primary winding is connected across the terminals of the motor 9 and the secondary winding is connected in circuit with the potentiometer 95.

A rectifier 99 is included in circuit with the tachometer generator 96 and the potentiometer 95. The polarity of this rectifier is such that no anti-hunt voltage is supplied from the tachometer generator 96 to the amplifier 15 when the rotation of the motor 9 is in a direction to move the upper mill roll 4 in the upward direction.

To further the stabilization of the system, two reversely connected selenium cell rectifiers 100 and 101 are connected in circuit between the vernier Selsyn of the active roll opening selector and the input circuit of the amplifier 15. These selenium cell rectifiers have a non-linear characteristic so that very little current is conducted in the rectifying direction until the voltage per plate reach approximately .3. With the rectifier so connected, no signal voltage is applied to the input circuit of the amplifier 15 until there is a few degrees of positional disagreement between the vernier Selsyn 45 connected to the mill roll and the vernier Selsyn of the active selector unit.

With the above understanding of the elements and their organization the operation of the system itself will be readily understood from the following detailed description: The dials for each selector unit are set to their correct positions for the rolling schedule of the billet which is to be reduced. It is assumed that the mill roll 4 is at its upper limiting position, i. e., the rolls are at their maximum opening.

The roll 4 is caused to move to the correct position for the first pass by movement of the arm 13a of the dial switch to the number one position in which the movable contact 13a engages the stationary contact at the first pass position. In response to the closing of these contacts, the operating coil 58c of the switch 58 is energized and closes its normally open contacts 58a and 58b thereby to complete the connections from the rotor windings of the coarse Selsyn 41 and the vernier Selsyn 42 of the first pass selector unit to the input circuit of the amplifier 15. It is assumed that the distance of the roll 4 from the preselected position for the first pass is greater than the distance which corresponds to 5 degrees of positional disagreement between the rotors of the coarse Selsyns 41 and 45. Consequently, the voltage from the Selsyn 41 is sufficient to ionize the valves 56 and 57 so that the signal voltage from the Selsyn is applied to the grids 29d and 29e of the first stage valve 29. As a result, an exciting current is supplied to the field winding 17a of the supply generator 17 so that a voltage is supplied to the motor 9 which causes the motor to drive the mill roll 4 toward the preselected position for the first pass at a speed proportional to the positional disagreement of the rotors of the Selsyns 41 and 45.

The signal voltage supplied from the Selsyn 41 to the input of the amplifier 82 causes a sufficient voltage to be supplied to the operating coil 93a of relay 93 to cause the relay to pick up and open its normally closed contacts, thereby to remove the short circuit from the reference voltage resistor 74. The operating coil 71b of the relay 71 is energized by the voltage supplied from the tachometer generator 72. In response to energization the relay 71 picks up and opens its normally closed contacts 71a to remove the short circuit from the reference voltage resistor 65.

Following the removing of the short circuits from the reference voltage resistors 65 and 74, the control field winding 16f is controlled to limit the current which flows in the armature circuit of the motor 9 and also to limit the voltage of the supply generator 17 to predetermined values. At the beginning of the movement of the roll 4 when its distance to the preselected position for the first pass is large, the signal voltage supplied from the Selsyn 41 to the amplifier 82 produces a large reference voltage across the reference voltage 74. Consequently, the voltage of the supply generator and the speed of the motor 9 are permitted to rise to a high value which corresponds to the magnitude of the reference voltage.

As the mill roll 4 approaches its preselected position, the signal voltages supplied from the Selsyn 41 to the amplifiers 15 and 82 decrease correspondingly. The decrease in the voltage supplied to the amplifier 15 produces a decrease in the voltage supplied from the amplifier 15 to the control field windings 16c and 16d of the exciter 16. This in turn produces a decrease in the voltage of the generator and a corresponding decrease in the speed of the motor. The decrease in the signal voltage supplied to the amplifier 82 reduces the reference voltage across the resistor 74 so that the voltage of the generator 17 and the resulting speed of the motor 9 are progressively decreased by the decreasing reference voltage across the resistor 74 as the mill roll 4 approaches a preselected position.

When the distance of the mill roll 4 from the preselected position is less than the distance which corresponds to 5 degrees positional disagreement of the Selsyns 41 and 45, the signal voltage supplied from the Selsyn 41 to the amplifier 15 is no longer sufficient to maintain conduction through the valves 56 and 57. These valves therefore become non-conducting and the amplifier 15 is controlled by the signal voltage supplied from the vernier Selsyn 42.

As the mill roll 4 more closely approaches the preselected position, the progressive decrease in the reference voltage across the resistor 74 causes the voltage of the generator 17 and the motor 9 to be progressively decreased. Simultaneously, the voltage supplied from the potentiometer 95 to the input circuit of the amplifier 15 in opposition to the signal voltage from the Selsyn 42 further reduces the excitation of the generator 17, thereby reducing the tendency to hunt to a minimum.

When the mill roll is within a few thousandths of an inch of the preselected position, the signal voltage supplied from the Selsyn 41 to the amplifier 82 decreases to such a low value that the voltage supplied from the amplifier to the operating coil 93a is no longer sufficient to maintain the relay contacts open. Responsively to deenergization, the relay drops out to open its normally closed contacts, thereby substantially to short circuit the reference voltage resistor 74 and to reduce the reference voltage substantially to zero. As a result of the reduction of the reference voltage to this low value, the voltage of the generator 17 is reduced to such a low value that the motor 9 comes to rest. Since the voltage of the generator is not reduced to zero, a current is caused to circulate in the armature of the motor 9 which maintains a pressure on the mill roll 4 in the downward direction. The motor being at rest, it has no countervoltage and this circulating current may rise to a value which would overheat the motor. However, this is prevented by the operation of the relay 71, which in response to zero voltage of the tachometer generator 72 drops out to close its contacts 71a. In closing, contacts 71a effectively short circuit the reference voltage resistor 65. Thus, the reference voltage proportional to armature current which appears across the resistor 69 is compared with a very low reference voltage. If the voltage drop across the resistor 69 exceeds the reference voltage which is approximately zero, the difference between the two voltages excites the current limit voltage winding 16f of the exciter 16 in such a direction that the exciting current supplied to the field winding 17a of the generator 17 is still further reduced.

The movement of the mill roll 4 to the successive selected positions for which the roll opening selector units are adjusted is accomplished by movement of the contact arm 13a of the pass selector to its corresponding successive positions.

If for any reason the operator should move the contact arm 13a farther than intended so that the mill roll 4 is moved beyond the desired position it may be brought back to the desired position by returning the arm 13a of the pass selector to the correct position. In this case the operation is the same as that described in the foregoing with the exception that the voltages supplied from the Selsyns 41 and 42 to the amplifier 15 are of reverse phase. This causes the motor 9 to rotate in the reverse or up direction. Owing to the polarity of the rectifier 99 no anti-hunt voltage is supplied from the anti-hunt tachometer generator 96 to the input of the amplifier 15 and consequently the roll overshoots the correct position in the up direction. In overshooting, the polarities of the signal voltages supplied from the Selsyns to the amplifier are reversed and the roll 4 is levelled to the correct position at low speed. During this levelling operation in the downward direction the anti-hunt circuits are again effective and the roll 4 is brought to its correct position without overshooting in the downward direction. Thus, irrespective of the position of the roll from which it is moved to a selected position, its final approach to the selected position is always in the same direction. This feature eliminates the erratic effects which would otherwise result from back lash in the gearing. Consequently, the dials always read the correct roll opening when the mill roll comes to rest.

Figure 2:
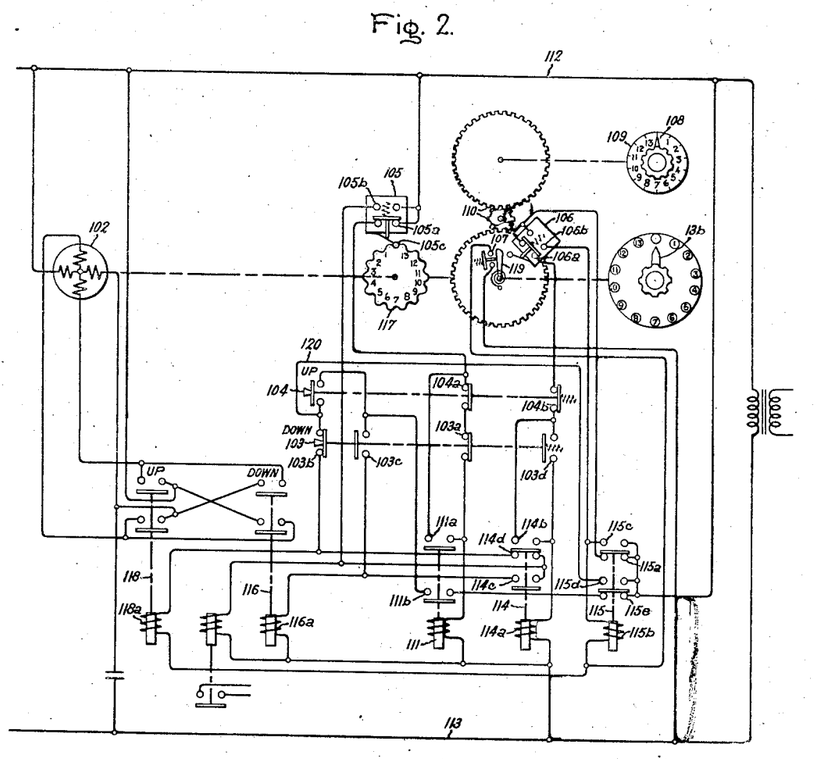
Fig. 2 is a simple, diagrammatical illustration of a detail.

The movable contact arm 13a may be moved by means of an electric motor instead of manually by means of the knob 13b. For this purpose, an electric motor 102 is provided which is under the control of a manually operated down push-button switch 103, a manually operated up push-button switch 104, a detent type limit switch 105, and limit switches 106 and 107.

The limit switch 106 serves to control the motor 102 to return the pass selector arm to the zero position after a number of passes which is determined by the position to which the pointer 108 is moved on an indicating dial 109.

Assuming that a total of seven passes is desired in a rolling program, the pointer 108 is moved by its knob until it coincides with the numeral 7 on the dial 109. In response to this movement, the limit switch 106 is rotated through gearing 110 to a corresponding position.

The operation is as follows: The operating coil of a relay 111 is connected across the source 112, 113 through the normally closed contacts 103a and 104a and the normally closed contacts 105a of the detent limit switch 105. In response to energization, the relay 111 picks up to close its normally open contacts 111a and 111b. Relay 111 seals itself in through contacts 111a. With the movable roll 4 in its uppermost position for the widest roll opening, the down pushbutton switch 103 is depressed to open its normally closed contacts 103a and 103b and to close its normally open contacts 103c and 103d. Contacts 103d in closing complete an energizing circuit for the operating coil 114a of a control relay 114. The circuit extends from the lower side 113 of the source through the coil 114a, contacts 103d, normally closed contacts 104b, normally closed contacts 106a of the preset limit switch, normally closed contacts 115a of relay 115 to the positive side 112 of the source. In response to energization, the relay 114 closes its normally open contacts 114b and 114c and opens its normally closed contacts 114d. Contacts 114b in closing complete a sealing-in circuit in parallel with the contacts 103d of the pushbutton switch. Contacts 103c in closing complete an energizing circuit for the operating coil 116a of the down contactor 116. This circuit is traced from the lower side of the source 113 through the operating coil 116a, contacts 103c in the closed position thereof, contacts 111b, normally closed contacts 115e of relay 115 to the upper side 112 of the source. In response to energization, the down contactor 116 closes its contacts to effect energization of the motor 102 for rotation in a direction to move the contact arm 13a of the pass selector and the pointer 13b toward the number one pass position.

As the motor rotates, the detent disk 117 is driven in a clockwise direction and the detent follower 105c is moved by the first tooth of the disk to open the normally closed contacts 105a and to close the normally open contacts 105b. The closing of contacts 105b provides a maintaining circuit for the operating coil 116a of the down contactor. This maintaining circuit is traced from the lower side of the source 113 through the coil 116a, contacts 114c, contacts 105b to the positive side of the source. Pushbutton switch 103 may now be released. The opening of contacts 105a of the detent limit switch interrupts the energizing circuit for the operating coil of the relay 111 which thereupon drops out and opens its normally open contacts.

As the movement of the detent disk continues, the detent follower 105c drops into the detent for the first position thereby reclosing the contacts 105a and opening the contacts 105b of the detent limit switch. Contacts 105b in opening interrupt the energizing circuit for the operating coil of the down contactor which thereupon drops out and stops the motor 102 with the contact arm 13a of the selector in engagement with the number one stationary contact and the pointer 13b in the number one pass position. In response to the engagement of the contact 13a with the first stationary contact, the motor 9 is started to move the mill roll 4 to the first pass position. The operation is identical with that described in the foregoing in connection with the manual movement of the contact arm 13a into engagement with the first stationary contact. The down pushbutton switch 103 must be depressed again to initiate a movement of the contact arm 13a to the second pass position.

If it is desired to move the selector switch in the counterclockwise direction, the up pushbutton switch 104 is depressed. This completes an energizing circuit for the operating coil 118a of the up contactor 118 which picks up to close its contacts and complete the energization of the motor 102 for rotation in a direction to move the contact arm 13a and the pointer 13b in a counterclockwise direction to the next lower number pass opening position.

If the clockwise rotation of the contact arm 13a and the pointer 13b is to be continued, the down pushbutton switch 103 is depressed following the completion of each pass of the strip through the mill rolls thereby to advance the contact arm 13a and the pointer 13b to successive pass positions in which successive roll opening selector units are connected to the amplifier 15. In the final pass position set upon the selector 109, the movable arm 119 which is driven by the motor 102 closes the normally open contacts 106a of the preset limit switch and opens the normally closed contacts 106b. Contacts 106a in opening interrupt the energizing circuit for the operating coil 114a of relay 114 which thereupon closes its normally closed contact 114d and opens its normally open contacts 114b and 114c. Contacts 106b in closing complete an energizing circuit for the operating coil 115b of relay 115 which picks up and closes its normally open contacts 115c and 115d and opens its normally closed contacts 115a and 115e. The contacts 115c in closing complete a sealing-in circuit for the relay. When the pushbutton switch 103 is released, an energizing circuit is completed for the operating coil of the up contactor 118 which is traced from the lower side of the source 113 through the normally closed contacts 107, operating coil 118a, contacts 103b, conductor 129, contacts 115d to the upper side of the source. In response to energization, the up contactor closes its contacts to complete energization of the motor 102 for rotation in a direction to return the movable contact arm 13a and the pointer 13b to the zero position. When the arm 13a and the pointer 13b reach the zero position, the arm 119 opens the contacts 107 thereby to interrupt the energizing circuit for the operating coils of the relay 115 and the up contactor 118, which is in response to deenergization drop out. The contactor 118 in dropping out stops the motor 102 and the control is thus left in a reset condition for subsequent operations.

Although in accordance with the provisions of the patent statutes this invention is described as embodied in concrete form and the principle thereof has been explained together with the best mode in which it is now contemplated applying that principle, it will be understood that the apparatus shown and described are merely illustrative and that the invention is not limited thereto since alterations and modifications will readily suggest themselves to persons skilled in the art without departing from the true spirit of this invention and the scope of the annexed claims.

What I claim as new and desire to secure by Letters Patent of the United States is:

1. A control system for a mill having a pair of rolls and movable supporting means for one of said rolls comprising a motor for driving said supporting means to vary the pass opening between said rolls, means for supplying a voltage to said motor comprising an adjustable voltage generator provided with a field winding, a pass opening selector device, means responsive to positional disagreement of said selector device and said supporting means for controlling the energization of said generator field winding to cause said motor to drive said supporting means toward a position of correspondence with said selector device, means for limiting the current in said field winding to a predetermined value, and means for varying the magnitude of said predetermined value in accordance with said positional disagreement.

2. A control system for a mill having a pair of rolls and movable supporting means for one of said rolls comprising a motor for driving said supporting means to vary the pass opening between the rolls, means for supplying a voltage to said motor comprising an adjustable voltage generator provided with a field winding, means for supplying excitation current to said field winding comprising an exciter provided with a main control field winding and an auxiliary opposing field winding, a roll opening selector device, electric valve means responsive to positional disagreement of said selector device and supporting means for controlling the energization of said control field winding to control said motor to drive said supporting means toward a position of correspondence with said selector device, means for controlling the excitation of said exciter to limit the current supplied to said generator field winding to a predetermined value, and means responsive to said positional disagreement for varying the magnitude of said predetermined value of generator field current.

3. A control system for a mill having a pair of rolls and movable supporting means for one of said rolls comprising a motor for driving said supporting means to vary the pass opening between the rolls, means for supplying a voltage to said motor comprising an adjustable voltage generator provided with a field winding, a pass opening selector device, means responsive to positional disagreement of said selector device and said supporting means for controlling the excitation of said field winding to cause said motor to drive said supporting means toward a position of correspondence with said selector device, and means for varying said position of correspondence to compensate for variations in the diameter of the rolls.

4. A control system for a mill having a pair of rolls and movable supporting means for one of said rolls comprising a motor for driving said supporting means to vary the pass opening between the rolls, means for supplying a voltage to said motor comprising an adjustable voltage generator provided with a field winding, a pass opening selector device, means responsive to positional disagreement of said selector device and said supporting means for controlling the excitation of said field winding to cause said motor to drive said supporting means toward a position of correspondence with said selector device comprising a rotary induction device connected to said selector device, a second rotary induction device connected to said supporting means and electrical connections between said induction devices, and means for varying said position of correspondence to compensate for variations in the diameter of the rolls comprising an electrical differential device included in said connections.

5. A control system for a mill having a pair of rolls and movable supporting means for one of said rolls comprising a motor for driving said supporting means, a pass opening selector device, means responsive to positional disagreement of said selector device and supporting means for producing a control voltage, electric valve means responsive to said control voltage for controlling the energization of said motor to drive said supporting means toward correspondence with said selector device, and means for modifying the operation of said control voltage producing means to compensate for variations in the diameter of the mill rolls.

6. A control system for a mill having a pair of rolls and movable supporting means for one of said rolls comprising a motor for driving said supporting means to vary the pass opening between said rolls, means for supplying a voltage to said motor comprising an adjustable voltage generator provided with a field winding, means for controlling the energization of said field winding comprising an exciter dynamo electric machine provided with a main control field winding, a pass opening selector device, means responsive to positional disagreement of said selector device and said supporting means for controlling the excitation of said main control field winding to cause said motor to drive said supporting means toward correspondence with said selector device, and means limiting the armature current of said motor and the field current of said generator to predetermined values comprising a differential field on said exciter having connections to the armature circuit of said motor and additional connections to the field circuit of said generator.

7. A control system for a mill having a pair of rolls and movable supporting means for one of said rolls comprising a motor for driving said supporting means to vary the pass opening between the rolls, means for controlling the supply of voltage to said motor comprising a dynamo electric machine provided with a main control field winding, a pass opening selector device, means responsive to positional disagreement of said selector device and said supporting means for controlling the energization of said control field winding to cause said motor to drive said supporting means toward correspondence with said selector device, means for limiting the current supplied to said motor to a predetermined value comprising a source of reference voltage, means for deriving from the armature circuit of said motor a signal voltage proportional to current and a differential field winding on said dynamo electric machine excited by the difference of said reference and derived voltages, and means responsive to a predetermined low value of speed of said motor for reducing said reference voltage substantially to zero thereby to limit the stalled armature current of said motor to a predetermined low value.

8. A control system for a mill having a pair of rolls and a movable supporting means for one of the rolls comprising a motor for driving the supporting means to vary the pass opening between the rolls, means for supplying a voltage to said motor comprising an adjustable voltage generator provided with a field winding, means for supplying excitation current to said field winding comprising an exciter dynamo electric machine provided with a control field winding, a pass opening selector device, means responsive to positional disagreement of said selector device and supporting means for controlling the energization of said control field winding to cause said motor to drive said supporting means toward correspondence with said selector device, means for limiting the current of said generator field winding to a predetermined value comprising a source of reference voltage, means for deriving a voltage proportional to said generator field current and a differential field winding on said exciter machine energized by the difference of said reference and derived voltages, and means for varying said generator field current in accordance with said positional disagreement comprising means responsive to said positional disagreement for varying said reference voltage.

9. A control system for a mill having a pair of rolls and a movable supporting means for one of the rolls comprising a motor for driving the supporting means to vary the pass opening between the rolls, means for supplying a voltage to said motor comprising an adjustable voltage generator provided with a field winding, means for supplying excitation current to said field winding comprising an exciter dynamo electric machine provided with a control field winding, a pass opening selector device, means responsive to positional disagreement of said selector device and supporting means for controlling the energization of said control field winding to cause said motor to drive said supporting means toward correspondence with said selector device, means for limiting the current of said generator field winding to a predetermined value comprising a source of alternating voltage, a rectifier for deriving a direct reference voltage from said source, means for deriving a signal voltage proportional to said generator field current and a differential field winding on said exciter machine energized by the difference of said reference voltage and said signal voltage, and means for varying said generator field current comprising a saturable core reactor having its reactance winding connected between said source and said rectifier and having the excitation of its saturating winding controlled by said positional disagreement responsive means for varying said reference voltage.

10. A control system for a mill having a pair of rolls and a movable supporting means for one of the rolls comprising a motor for driving the supporting means to vary the pass opening between the rolls, means for supplying a voltage to said motor comprising an adjustable voltage generator provided with a field winding, means for supplying excitation current to said field winding comprising an exciter dynamo electric machine provided with a control field winding, a pass opening selector device, means responsive to positional disagreement of said selector device and supporting means for controlling the energization of said control field winding to cause said motor to drive said supporting means toward correspondence with said selector device, means for limiting the armature current of said motor to a predetermined value comprising a first source of reference voltage, means for deriving a voltage proportional to armature current and a differential field winding on said exciter machine energized by the difference of said reference and derived voltages, and means for varying the generator field current in accordance with said positional disagreement comprising a source of a second reference voltage, means for deriving a signal voltage from said generator field current and connections for supplying the difference of said second reference voltage and said signal voltage to said differential field winding.

11. A control system for a mill having a pair of rolls and a movable supporting means for one of the rolls comprising a motor for driving the supporting means to vary the pass opening between the rolls, means for controlling the supply of voltage to said motor comprising electric valve apparatus provided with a control grid, a pass opening selector device, means responsive to positional disagreement of said selector device and supporting means for supplying a control voltage to said grid to cause said motor to drive said supporting means toward correspondence with said selector device, stabilizing means for controlling said valve means to prevent said supporting means from overshooting said position of correspondence, and means for rendering said stabilizing means ineffective for one direction of rotation to permit overshooting said position of correspondence so that said supporting means is always moved in the same direction to rest in said position of correspondence.

12. A control system for a mill having a pair of rolls and a movable supporting means for one of the rolls comprising a motor for driving the supporting means to vary the pass opening between the rolls, means for controlling the supply of voltage to said motor comprising electric valve apparatus provided with a control grid, a pass opening selector device, means responsive to positional disagreement of said selector device and supporting means for supplying a control voltage to said grid to cause said motor to drive said supporting means toward correspondence with said selector device, stabilizing means for controlling said valve means to prevent said supporting means from overshooting said position of correspondence comprising a tachometer generator driven by said motor for supplying an antihunt voltage to said control grid, and means for limiting the operation of said stabilizing means to one direction of rotation of said motor comprising a unidirectional conducting device included in circuit between said tachometer generator and said control grid.

13. A control system for a mill having a pair of rolls and a movable supporting means for one of the rolls comprising a motor for driving the supporting means to vary the pass opening between the rolls, means for controlling the supply of voltage to said motor comprising electric valve apparatus provided with a control grid, a pass opening selector device, means responsive to positional disagreement of said selector device and supporting means for supplying a control voltage to said grid to cause said motor to drive said supporting means toward correspondence with said selector device, stabilizing means for controlling said valve means to prevent said supporting means from overshooting said position of correspondence and a transformer having its primary winding connected across the terminals of said motor and its secondary winding connected in circuit between said tachometer generator and said grid, and means for limiting the operation of said stabilizing means to one direction of rotation of said motor comprising a unidirectional conducting device included in circuit between said tachometer generator and said control grid.

14. A control system for a mill having a pair of rolls and a movable supporting means for one of the rolls comprising a motor for driving the supporting means to vary the pass opening between the rolls, means for controlling the supply of voltage to said motor comprising electric valve apparatus provided with a control grid, a pass opening selector device, means responsive to positional disagreement of said selector device and supporting means for supplying a control voltage to said grid to cause said motor to drive said supporting means toward correspondence with said selector device, a nonlinear resistance device included in circuit with said grid to provide a narrow dead zone, stabilizing means for controlling said valve means to prevent said supporting means from overshooting said position of correspondence, and means for rendering said stabilizing means ineffective for one direction of rotation to permit overshooting said position of correspondence so that said supporting means is always moved in the same direction to rest in said position of correspondence.

DONALD E. GARR.